United States Patent [19]
Barrett et al.

[11] Patent Number: 5,560,017
[45] Date of Patent: Sep. 24, 1996

[54] SYSTEM WITH CLOCK FREQUENCY CONTROLLER RESPONSIVE TO INTERRUPT INDEPENDENT OF SOFTWARE ROUTINE AND SOFTWARE LOOP REPEATEDLY EXECUTING INSTRUCTION TO SLOW DOWN SYSTEM CLOCK

[75] Inventors: David M. Barrett, Tyngsboro, Mass.; Mary Letourneau, Westmoreland, N.H.; Patricia A. Martin, Groton, Mass.; J. Michael McNally, Derry, N.H.

[73] Assignee: Wang Laboratories, Inc., Billerica, Mass.

[21] Appl. No.: 236,878

[22] Filed: Apr. 29, 1994

Related U.S. Application Data

[63] Continuation of Ser. No. 654,406, Feb. 8, 1991, abandoned, which is a continuation-in-part of Ser. No. 611,990, Nov. 9, 1990, abandoned.

[51] Int. Cl.⁶ ............................. G06F 15/16; G06F 1/08; G06F 1/26
[52] U.S. Cl. ................. 395/733; 395/750; 395/550; 364/DIG. 1; 364/231.1; 364/270.2; 364/273.1; 364/DIG. 2; 364/948.8
[58] Field of Search ............................. 395/550, 750, 395/733; 307/269, 480

[56] References Cited

U.S. PATENT DOCUMENTS

| | | | |
|---|---|---|---|
| 4,381,552 | 4/1983 | Nicilini et al. | 364/900 |
| 4,698,748 | 10/1987 | Juzswik et al. | 364/200 |
| 4,851,987 | 7/1989 | Day | 364/200 |
| 4,965,524 | 10/1990 | Patchen | 328/72 |
| 5,083,266 | 1/1992 | Watanabe | 395/275 |
| 5,142,684 | 8/1992 | Perry et al. | 395/550 |
| 5,163,146 | 11/1992 | Antanaitis, Jr. et al. | 395/550 |
| 5,218,704 | 6/1993 | Watts, Jr. et al. | 395/750 |
| 5,222,239 | 6/1993 | Rosch | 395/750 |
| 5,261,082 | 11/1993 | Ito et al. | 395/550 |

FOREIGN PATENT DOCUMENTS

| | | | |
|---|---|---|---|
| 0271280 | 6/1988 | European Pat. Off. | G06F 3/03 |
| 0348045 | 5/1989 | European Pat. Off. | |
| 0363567 | 6/1989 | European Pat. Off. | |
| 0395469 | 4/1990 | European Pat. Off. | |

OTHER PUBLICATIONS

IBM Technical Disclosure Bulletin, vol. 29, No. 9, Feb. 1987, pp. 4122–4124, System Power Savings By Automatic Sleep Mode.

*Primary Examiner*—Thomas C. Lee
*Assistant Examiner*—D. Dinh
*Attorney, Agent, or Firm*—Ronald J. Paglierani

[57] ABSTRACT

In a portable computer the BIOS software slows the system clock frequency during idle periods. The BIOS software returns the system to its normal operating frequency when an awaited event such as a keystroke occurs. In the event of an interrupt while the system clock is at the lower frequency, a hardware clock control circuit responds to the interrupt to promptly increase the system clock frequency to the normal value. By decoding the old frequency, new frequency and the several available frequencies, the change in frequency is timed to maintain proper phase and duty cycle without interruption.

9 Claims, 8 Drawing Sheets

SYSTEM WITH CLOCK FREQUENCY CONTROLLER RESPONSIVE TO INTERRUPT INDEPENDENT OF SOFTWARE ROUTINE AND SOFTWARE LOOP REPEATEDLY EXECUTING INSTRUCTION TO SLOW DOWN SYSTEM CLOCK

This is a continuation of application Ser. No. 07/654,406 filed on Feb. 8, 1991, now abandoned which is a continuation-in-part of Ser. No. 07/611,990 filed Nov. 9, 1990, now abandoned.

BACKGROUND OF THE INVENTION

The transportability of a portable or so-called "laptop" computer is, of course, related to its overall size and weight. In recent years, there has been a drive on the part of manufacturers to produce computers with ever-decreasing weight, while maintaining or increasing computing power. In fact, there has been a remarkable rate of progress in the reduction in size and weight, and the increase in computing speed and information storage capabilities of laptop computers. Ever-decreasing overall size has resulted in calling the most recent hand held products "notebook" computers.

A significant part of the overall weight of a computer is attributable to its power source or battery. While batteries that weighed a number of pounds were acceptable heretofore, the weight of present batteries must now be measured in ounces, rather than in pounds. Last generation's battery alone weighed more than this generation's overall computer, including battery. At this time, it is desirable to manufacture notebook computers weighing approximately six pounds, no more than one pound of which is attributable to the power source.

The size of a battery generally dictates its electrical storage capacity. Therefore, reduced battery size results in reduced power storage. A typical battery may operate a computer system only up to two hours if used continually. A reduction in the power consumption of a system extends the amount of time the system can be battery powered before the battery must be replaced or recharged. Over the last few decades, extremely rapid progress in the miniaturization and integration of digital electronics has resulted in considerable reduction in the power consumption of digital circuitry.

Although the size and weight of portable computers continues to decrease, a full panoply of features must be supported. Such features include a hard disk drive, a floppy disk drive, a display, a keyboard and a processor. To one extent or another, each of these components requires eletrical power. While conventional approaches to saving energy often require one or more of the components to shut down when not being used, it has been found that as a practical matter, human users require certain components (e.g., the display) to be activated continually while in use.

In portable computers, and in particular, notebook computers, it is also desirable to reduce the amount of heat that must be dissipated. Heat generation is minimized by the use of CMOS logic components which use power only while switching, as opposed to TTL or ECL logic components that continually draw power. Nevertheless, heat generation is unavoidable. In order to dissipate this heat, conventional components such as heat sinks and cooling fans have been used to maintain an operable temperature. Not only do such devices add to the overall size and weight of the computer, but devices such as cooling fans also draw on the System battery, further reducing the period of time the battery can maintain a charge.

Power consumption and heat generation can be reduced by decreasing the speed of the system clock. The speed of all processor functions, such as the foreground and background processes, and the bandwidth of the I/O of the processor are proportional to the system clock speed. The reduced system clock speed approach is problematic since lower clock speeds result in poorer performance; the time required to complete an information processing task is proportional to the clock speed. In order to give users the best possible performance, the system must be run at the highest possible speed. Furthermore, background processes, such as communications programs and fax spoolers, may fail with reduced clock speeds.

One approach to reducing power requirements in portable computers has been to allow the software to signal that it is waiting for a user input and that the system clock should thus be slowed. When the awaited event such as a keystroke occurs, the software then initiates a speedup in the clock frequency. The speedup can occur without being noticed by the user. However, because the slow speed would affect other background tasks, such as communications, it is generally recommended that the speed of the processor not be slowed down when the system is coupled to a network. This is generally not a problem since, when coupled to a network, a system can usually be plugged into a wall outlet. In fact, some systems only allow the clock slowdown when power is supplied from the battery and it is thus assumed that the system is not coupled to a network.

SUMMARY OF THE INVENTION

It is desirable to allow the system to slow the clock frequency even when unlimited power is available in order to minimize heat generated by the system. By minimizing heat, the need for a cooling fan can be reduced or obviated and the size of the AC to DC power supply can be reduced, thus reducing the overall size and weight of the unit. In accordance with the present invention, the system clock frequency can be reduced during any wait state of the system; yet the clock controller responds to any condition which signals a need for a higher frequency and immediately returns the system clock to a normal frequency.

In accordance with the present invention, a processing unit processes software routines stored in memory at a normal frequency determined by a system clock generated by a clock control circuit. That control circuit includes circuitry responsive to a software routine processed in the processing unit to slow the system clock. For example, the system clock may be slowed while the applications software is waiting for a keystroke. The clock control circuit also includes circuitry responsive to an interrupt to the processing unit for returning the system clock to the normal frequency independent of any software routine. In the preferred embodiment, the clock control circuit decodes signals on a system bus indicative of an interrupt acknowledge from the processing unit to cause the system clock to return to the normal frequency.

Preferably, application software may initiate a wait cycle in a basic input/output system (BIOS) software routine which periodically sets the system clock at a reduced frequency. The BIOS software also causes the clock control circuit to return the system clock to the normal frequency once an awaited event occurs.

To ease the hardware requirements, the system changes the frequency in frequency steps. The first two steps may be initiated with decoding of signals responsive to an interrupt acknowledge from the processing unit. Subsequent frequency steps may be initiated by delayed interrupt acknowledge signals.

Preferably, the system clock generates a first clock signal and a second clock signal at twice the frequency of the first signal. The clock control circuit latches a new second frequency select signal at a time controlled by timing of the current first clock signal, the current second clock signal and the new second clock signal.

In a specific embodiment of the invention, a clock source generates all available system clock signals. A selection circuit selects one of the available clock signals as a system clock. The selection circuit includes a software responsive circuit for receiving data input to select a new system clock frequency from the software routine processed in the processing unit. It also includes an interrupt responsive circuit to select a new system clock frequency dependent on the current system frequency and a normal clock frequency. A frequency register receives and latches a new system clock select signal from one of the software responsive and interrupt responsive circuits. Latching of the new system clock signal in the frequency register is synchronized by a circuit which establishes a proper phase relationship between the current system clock and the selected system clock to thus maintain proper clock duty cycle.

Normal clock frequency may be written into a register by a software routine processed by the processing unit and the stored value is read by the interrupt responsive circuit. Software may also store an indication of the reduced frequency in a register. The interrupt responsive circuit may be enabled to cause a first step in frequency responsive to a first interrupt acknowledge signal, a second step, if required, in response to a second interrupt acknowledge signal and a third step, if required, in response to a delayed interrupt acknowledge signal. Preferably, the system generates a first system clock and a second system clock of twice the frequency of the first system clock. The clock control circuit synchronizes frequency switching of the clock to a current first clock signal, a current second clock signal, and a new second clock signal.

BRIEF DESCRIPTION OF THE DRAWINGS

The foregoing and other objects, features and advantages of the invention will be apparent from the following more particular description of a preferred embodiment of the invention, as illustrated in the accompanying drawings in which like reference characters refer to the same parts throughout the different views.

DESCRIPTION OF THE PREFERRED EMBODIMENT

Figure 1:
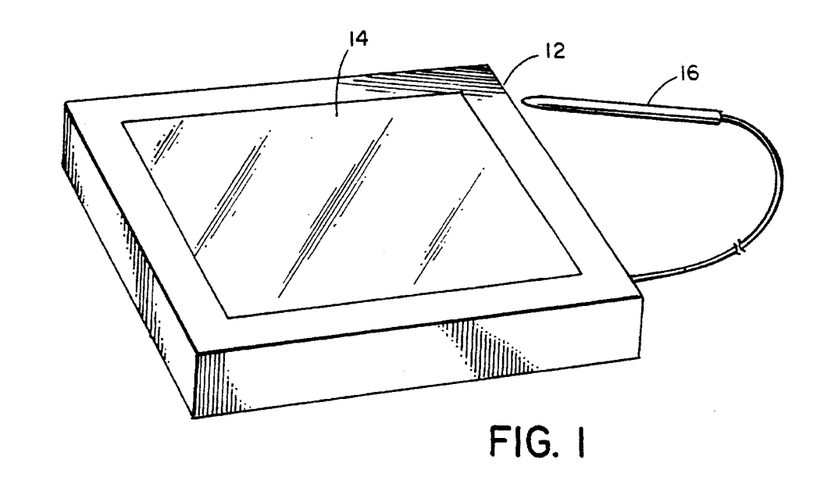
FIG. 1 is a perspective view of a laptop computer including a stylus as an input device.

A portable, laptop computer embodying the present invention is illustrated in FIG. 1. The housing 12 has overall dimensions of less than 12"×12"×1.5". The housing encloses the full microprocessor-based computer system as well as a hard disk drive. User interface is by means of a liquid crystal display 14 and a stylus 16. Position of the stylus relative to the display is sensed by a transparent template over the display. A port is also provided for coupling a keyboard to the system (not shown). The system may be powered from a wall outlet or from a set of four rechargeable C sized NiCad cells, each rated at approximately 1.5 volts so that the set has a maximum voltage of 5.7 to 6.5 volts which is clamped to 5.5 volts. The batteries weigh approximately 1 pound and the overall weight of the system, including the battery, is about 5 pounds.

Figure 2:
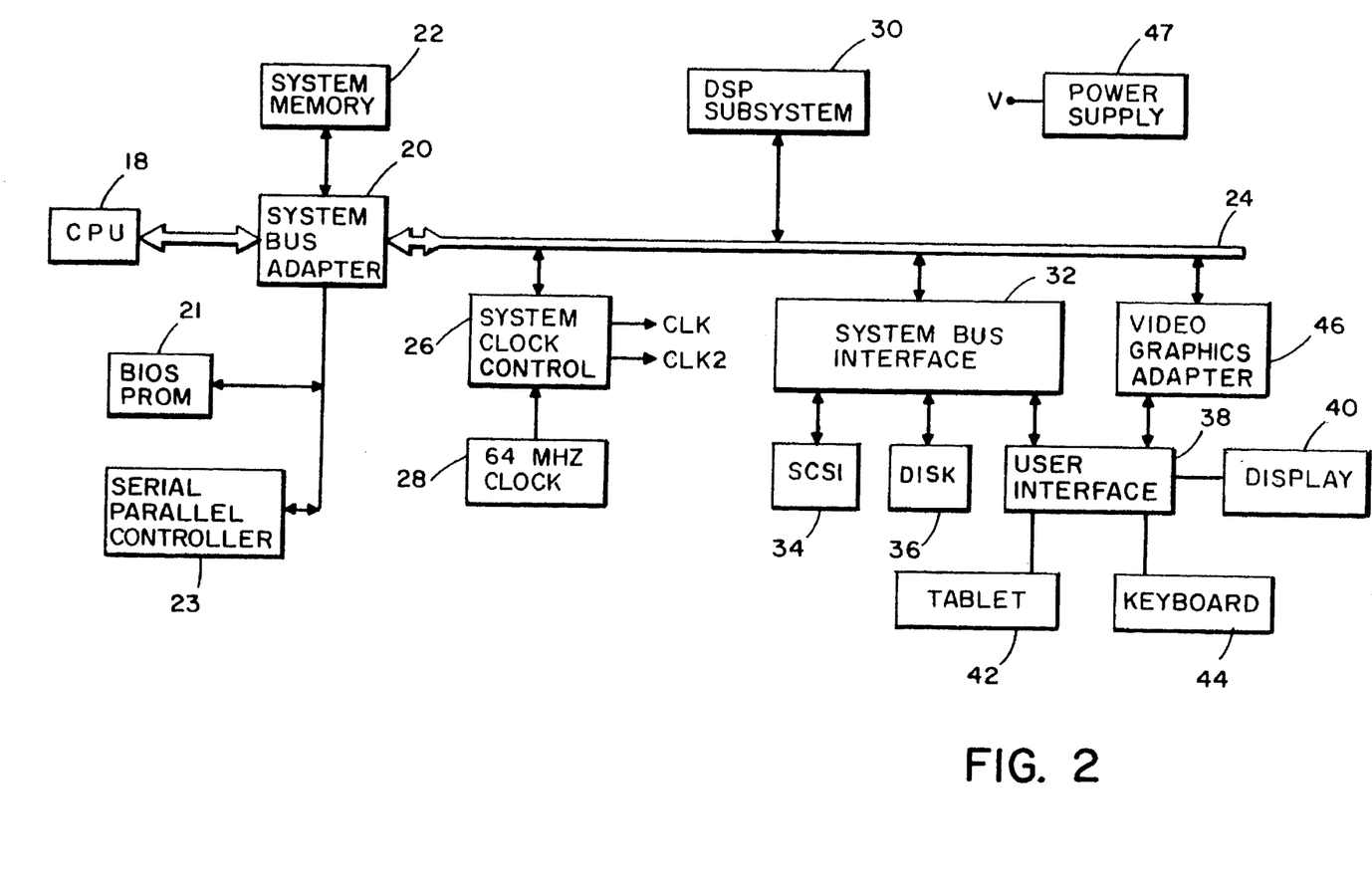
FIG. 2 is a system block diagram of the electronics of the computer of FIG. 1.

A system block diagram is presented in FIG. 2. The central processing unit (CPU) 18 is preferably a model 80386SX microprocessor provided by Intel Corporation. The CPU 18 communicates with other elements of the system through a bus adapter 20 which may be a western digital chipset including model numbers WD6000, WD6010, WD6020 and WD6036. The bus adapter includes bus arbitration circuitry, an interrupt controller and a direct memory access (DMA) controller. Through the system bus adapter 20, the CPU communicates with a system memory 22, a BIOS programmable read only memory (PROM) 21, a serial/parallel communications controller 23, and a system bus 24. Positioned on the system bus 24 is a system clock control 26. As will be discussed below, the clock control 26 receives a 64 MHz clock signal from a clock source 28 and generates clock signals CLK and CLK2, CLK2 being twice the frequency of CLK. In accordance with the present invention, CLK2 may be set at any of the frequencies of 4 MHz, 8 MHz, 16 MHz and 32 MHz.

Also positioned on the bus 24 is a digital signal processor (DSP) subsystem 30, a video graphics adapter (VGA) 46 and a system bus interface 32. The system bus interface allows communications to a small computer system interface (SCSI) device 34, the hard memory disk 36, and a user interface 38. The SCSI device may, for example, allow an external memory disk drive to be coupled to the system. The user interface 38 provides an interface to the display electronics 40, the stylus tablet 42, and any keyboard 44 coupled to the system. The display is shared, through the user interface 38, with the video graphics adapter 46. All components are powered by a power supply 47 which includes batteries.

Figure 3:
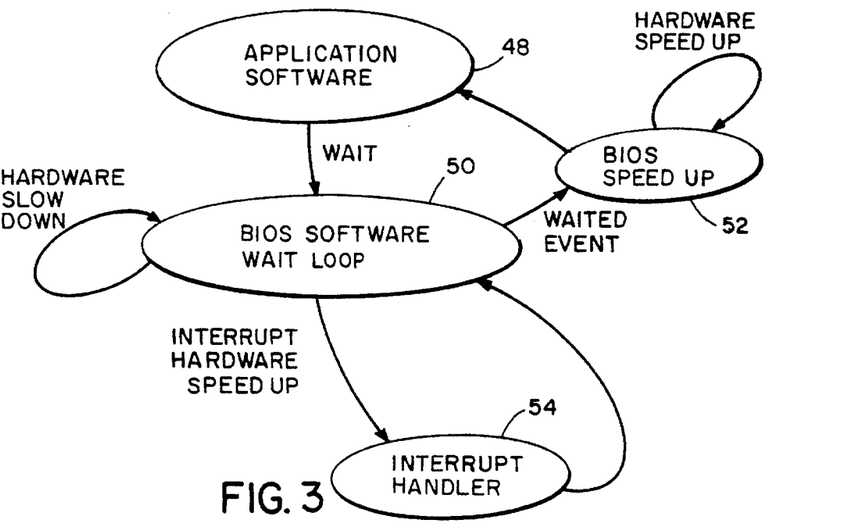
FIG. 3 is a schematic overview of the software implementing the present invention.

An overview of system clock slowdown and speedup is illustrated in FIG. 3. In processing the applications software 48, the system operates at a normal frequency which may be set through software by the user or which is at a default frequency of 32 MHz for CLK2. When the system must wait for some event, such as a keystroke or movement of stylus 16, to occur before further processing, the BIOS software stored in PROM 21 enters a wait loop at 50. During this wait loop, the BIOS software periodically calls upon the system clock control 26 to slow the system down to a minimum clock frequency previously defined by the user or by default. When the awaited event, such as keystroke, is received and is detected by the BIOS software, the software enters a speedup routine at 52. In that routine, the BIOS software signals to the system clock control 26 to increase the speed to the normal operating frequency. The system then returns to the application software 48 for proper response to the awaited event.

A problem solved by the present invention is that an event other than the awaited event may occur. Further, such an event may require immediate speedup of the system clock in order to avoid loss of information. For example, if data is received through the serial/parallel communications controller 23, data will likely be lost if the system is not immediately returned to normal operating frequency.

In accordance with the present invention, the system clock control. 26 monitors the system to detect any interrupt. When the interrupt is detected, the system clock control hardware immediately returns CLK and CLK2 to their normal frequencies independent of any software routine. Thus, by the time the interrupt handler 54 responds to the interrupt, the system is already operating at normal frequency. The system remains at that normal operating frequency until the end of the interrupt handler routine. The system then returns to the interrupted routine which in this case is the BIOS wait loop 50. Since the wait loop includes a periodic slowdown of the clock frequency, regardless of the present state of the clock, the system is soon returned to low frequency operation.

Figure 4:
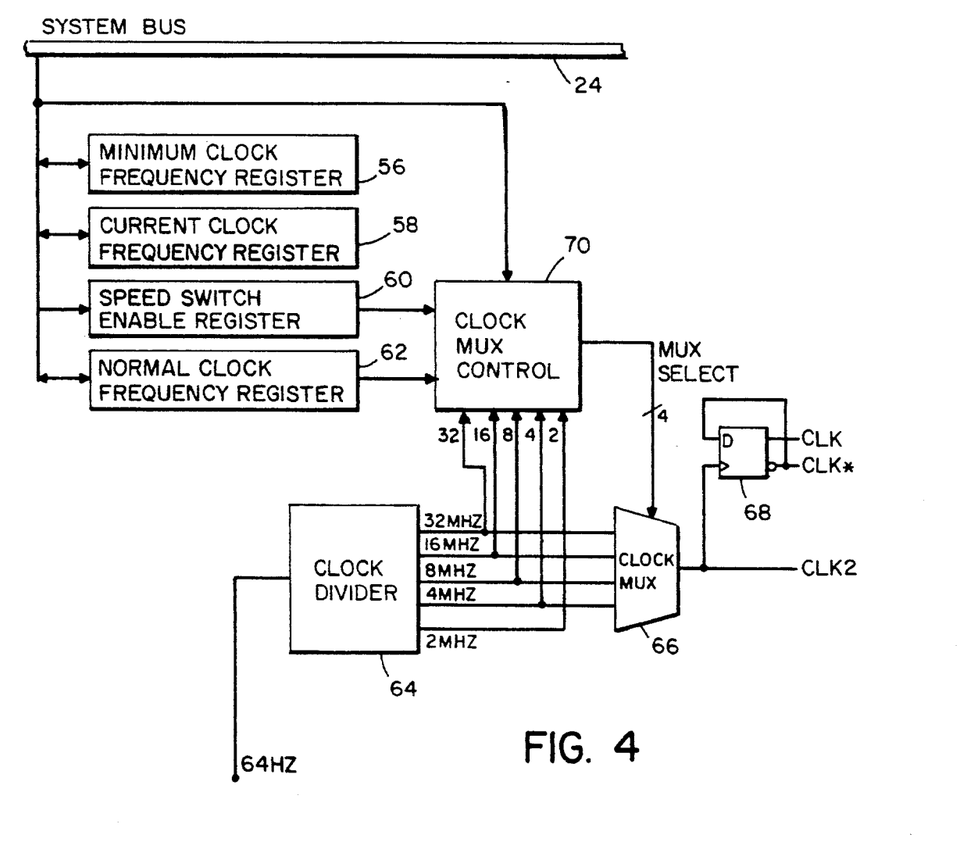
FIG. 4 is a block diagram of the system clock control circuit of FIG. 2.

A block diagram of the system clock control circuit 26 is presented in FIG. 4. The circuit includes four registers 56, 58, 60 and 62 which are coupled to the system bus 24. Applications software 48 may write data into these registers for future use by the BIOS software during slowdown or speedup or by the system clock control hardware 26 during speedup. Specifically, register 56 stores, in two bits, the minimum clock frequency selected by the user or by default. Those two bits encode one of the four CLK2 frequencies of 4 MHz, 8 MHz, 16 MHz or 32 MHz. When the BIOS software slows the system down, it slows to the frequency indicated in register 56. Register 58 stores the current clock frequency recognized by the BIOS software, This frequency is redefined with each slowdown in frequency and with each increase in frequency caused by the BIOS software. It is not affected by speedup in response to an interrupt. Speed switch enable register 60 is used by the BIOS routine during software slowdown and speedup to prevent an interrupt speedup by the clock control circuit. The normal clock frequency register 62 is used by both the BIOS software and the interrupt speedup hardware to set the normal operating frequency.

A clock source 28 provides a 64 MHz clock signal to a clock divider 64. The clock divider 64 has separate outputs for each of the four possible CLK2 frequencies—32, 16, 8, and 4 MHz. The signal which is applied to the CLK2 line is determined by selection of one of those four signals through a clock multiplexer (MUX) 66. The CLK signal is then generated by dividing the CLK2 signal by two in a flipflop 68. Selection of the appropriate frequency is by means of a clock MUX control circuit 70.

To simplify frequency switching with less aggressive circuit components, the clock MUX control 70 only allows stepped changes in frequency by twice or one half the current frequency. Thus, if the system is operating at 4 MHz, to return to a normal operating frequency of 32 MHz the MUX control steps through the 8 MHz and 16 MHz signals by first selecting them through the clock MUX 66. Further, timing of changes in frequency is critical to maintain the proper phase and duty cycles of all signals. These functions are performed by the clock MUX control circuit 70. Although all of the stages of the frequency divider may be arranged to be active at all times, by disabling stages of the divider that are not needed, power that would otherwise have been consumed by the toggling of those stages can be saved. So that the system is always prepared to switch to the next lower frequency, it is desirable that one stage below the stage generating the current clock be maintained active. Thus, when CLK2 is selected to be 32 MHz, the lowest two stages of the clock divider 64 are disabled; when CLK2 is selected to be 16 MHz, only the lowest stage of the clock divider 64 is disabled; and when CLK2 is selected to be either 8 or 4 MHz, all of the stages of the clock divider 64 are active.

Figure 5:
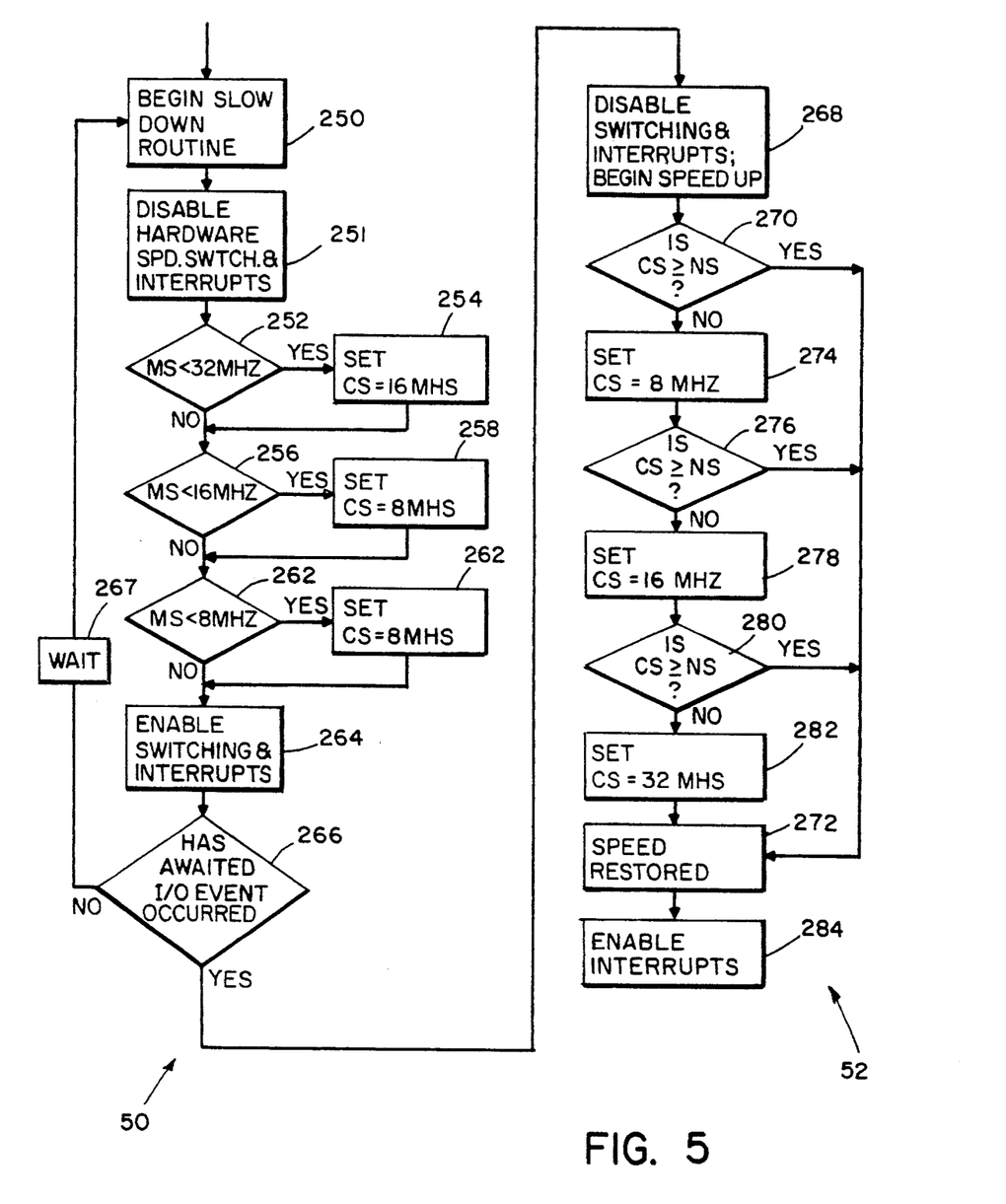
FIG. 5 is a flow chart of the BIOS software wait loop and BIOS speedup routines of FIG. 3.

A flow chart of the BIOS wait loop at 50 and the speedup routine 52 is presented in FIG. 5. The slowdown routine begins at 250. The speed switch enable 60 is first set at 251 to disable any hardware speed switching interrupts during the slowdown routine. Because an interrupt may have caused a speedup between wait loop cycles, the system assumes that the clock frequency of CLK2 is at 32 MHz even though it may have been previously slowed down during a previous loop of the wait routine.. At 252, it is determined whether the minimum clock frequency is less than 32 MHz. If so, the clock MUX control circuit 70 is caused to decrease the. CLK2 frequency to 16 MHz and the new frequency is written into the current clock frequency register 58 at 254. Next, at 256 the system compares the minimum clock frequency stored in register 56 to 16 MHz. If the minimum is less the frequency is stepped down to 8 MHz by the clock MUX control 70, and 8 MHz is written into the current clock frequency register 58. Finally, the minimum frequency is compared to 8 MHz at 260, and if the minimum is less than 8 MHz the system is set to 4 MHz at 262. If at any of the comparisons 252, 256 or 260, it is determined that the current frequency is equal to the minimum frequency, the system passes through to step 264. At 264 switching and interrupts are enabled by resetting the speed switch enable register 60.

The system then determines whether the awaited event has occurred by looking to a status bit stored in memory. If the event has occurred, the system moves on to the speedup routine 52. If not, the BIOS software loops back through a timed wait 267 to begin the slowdown routine again at 250. Since an interrupt speedup may have occurred at any time between the speed switch enable 264 and the speed switch disable 251, the BIOS system does not know, as it enters the slowdown routine with each loop, whether the frequency is at the current clock frequency indicated in register 58 or at the normal clock frequency to which it would have been driven with an interrupt speedup. Thus, it assumes that the system is operating at the high frequency as it passes through the slowdown routine. This may result in a short term increase in system frequency as, for example, when the frequency is set at 16 MHz at 254 even if it had already been at a lower 8 MHz. However, that stepup of frequency is for a neglible period of time. Also, the clock MUX control circuit 70 only allows a single step in frequency. Thus, if the system were operating at 4 MHz and the BIOS routine indicated that it should be set at 16 MHz at 254, the clock MUX control circuit 70 would ignore the instruction. Thus, in the worst case, where the system is still operating at 4 MHz, the frequency would not be changed at 254 but would be increased to 8 MHz at 258; but the frequency would then be promptly reduced to 4 MHz at 262.

The awaited event itself generally causes an interrupt. For example, a keystroke would cause an interrupt and the interrupt handler would then set a bit to indicate to the BIOS software that the event had occurred. The system would then leave the interrupt, and at 266 the BIOS routine would note the bit that had been set by the interrupt routine. Thus, where the event occurs, the system is actually sped up in response to the interrupt for that event. If that interrupt occurs after the check for the event at 266, the system may again slow down before the keystroke is actually processed by the BIOS software. However, that brief slowdown would not be apparent to a user.

The BIOS speedup routine 52 is also illustrated in FIG. 5. Again, the speed switching and interrupts are disabled by setting the bit in register 60. The current frequency is compared to the normal frequency at 270. If current frequency is greater than or equal to the normal frequency, frequency is considered restored at 272 and the interrupts are enabled at 284. If the current frequency is less than the normal operating frequency, the current frequency is set at 8 MHz through the clock MUX control 70 and the new speed is written into current clock frequency register 58. In this case, it is assumed that the current frequency was at 4 MHz and that setting the frequency to 8 MHz increases the frequency. If the current frequency has in fact been 8 MHz, there would be no switch in frequency; if it has been 16 MHz there would be a momentary but negligible decrease in frequency to 8 MHz. If the frequency had been at 32 MHz, the clock MUX control 70 would ignore the instruction because the system does not take more than one step at a time. The current frequency is compared to the normal operating frequency again at 276, and if it is not greater than or equal to the normal frequency it is set at 16 MHz at 278. The frequencies are again compared at 280, and if the normal operating frequency has not yet been reached it is set at 32 MHz at 282.

Figure 6:
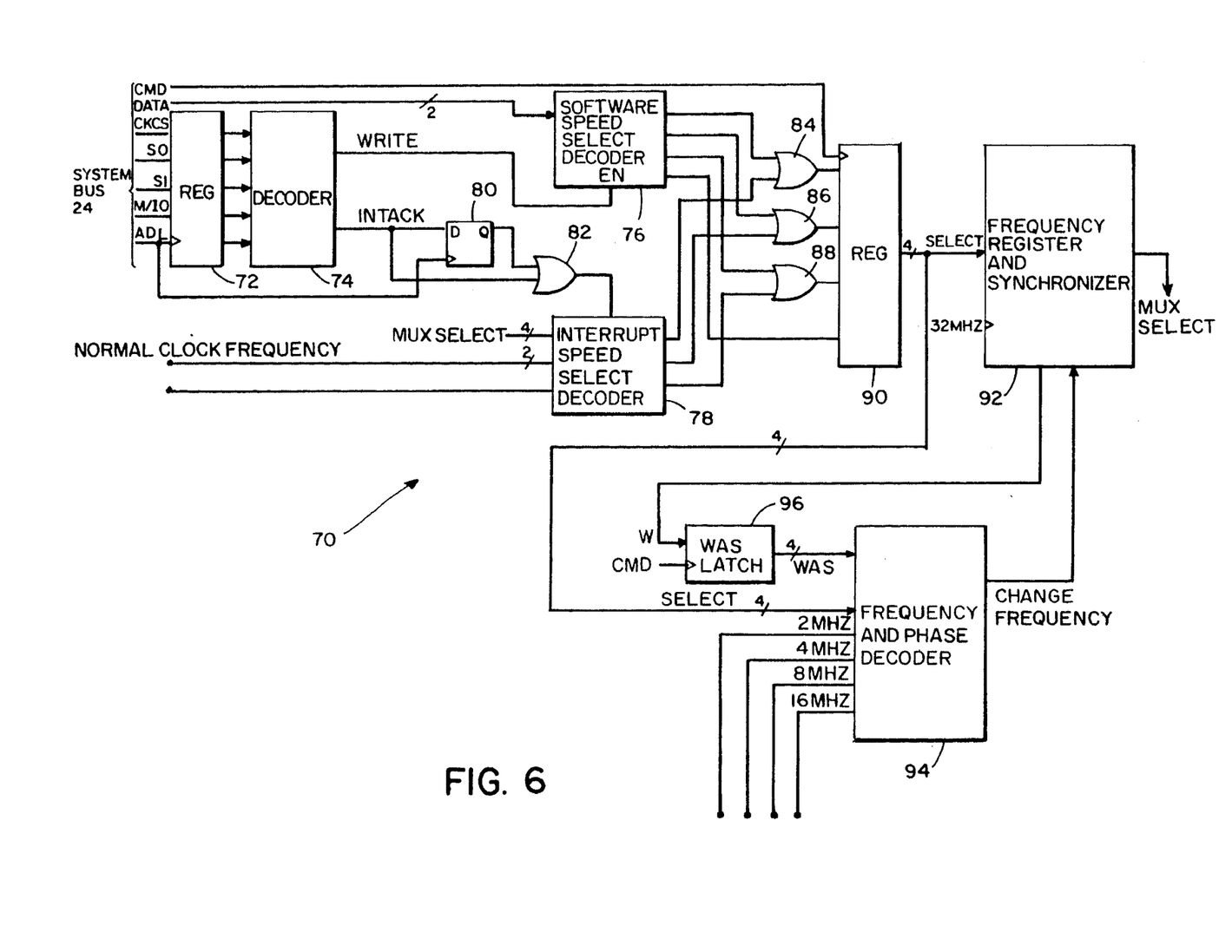
FIG. 6 is a schematic illustration of the clock MUX control of FIG. 4.

FIG. 6 is a schematic illustration of the circuitry of the clock MUX control 70.

Four control signals from the system bus 24 are periodically clocked into register 72 by the ADL control signal. The control decoder 74 responds to control signals CKCS, S0, S1 and M/IO to generate the signal WRITE when the BIOS software has signaled a change in speed. Software speed change is indicated by CKCS low, M/IO low, S0 low and S1 high. The new speed is indicated on two of the data lines. The WRITE signal enables a software speed select decoder 76 to decode those two signals.

The S0, S1, and M/IO signals low on the falling edge of ADL indicate that an interrupt to CPU 18 has occurred, an interrupt acknowledge signal has been sent by the CPU and the interrupt acknowledge has been converted by the system bus adapter 20 to drive the three control signals low. The clock control could monitor the interrupt acknowledge from the CPU 18, directly but the approach of monitoring the system bus 24 makes the clock control less dependent on the particular CPU processor. The three control signals are decoded by control decoder 74 to generate an internal interrupt acknowledge signal INTACK. This signal initiates an interrupt speedup.

Figure 7:
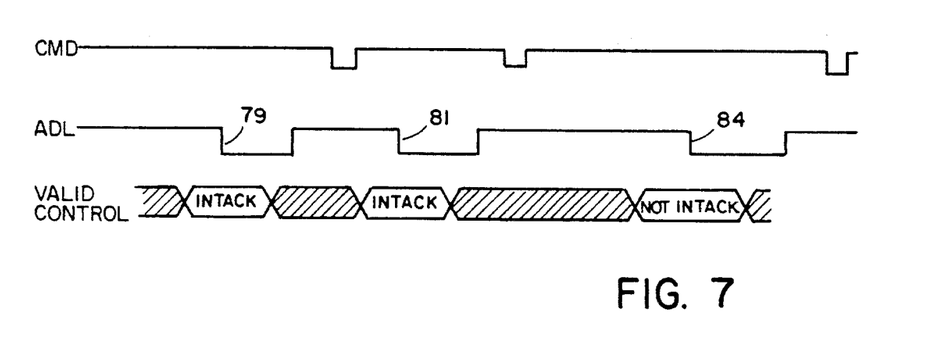
FIG. 7 is a timing chart indicating response of the circuit of FIG. 6 to an interrupt acknowledge cycle.

During an interrupt acknowledge cycle from the CPU 18, valid interrupt acknowledge states with S0, S1 and M/IO low are generated twice. As illustrated in FIG. 7, those valid interrupt acknowledge states are clocked into the register 72 on the falling edges 79 and 81 of the corresponding ADL signals. The valid INTACK outputs from the control decode may then be used to enable an interrupt speed select decode 78. However, three steps of increasing frequency may be required. To obtain a third signal to enable the interrupt speed select decode 78, the INTACK signal is latched in flipflop 80 clocked by the ADL signal. The delayed signal is ORed with INTACK by gate 82. Thus, on the next falling edge of the ADL signal at 84, where a valid INTACK signal would not be obtained by decoding signals S0, S1 and M/IO, the INTACK signal obtained at the following edge 81 is repeated to enable the decoder 78.

The interrupt speed select decoder 78 compares the present frequency indicated by the MUX select signal with the normal clock frequency stored in register 62 of FIG. 4. So long as speed switching is enabled by the bit in register 60, the decoder 78 generates a signal on one of its three output lines to indicate one of the frequencies 8 MHz, 16 MHz or 32 MHz to which CLK2 is to be switched. For example, if the MUX select is presently set at 8 MHz and the normal operating frequency is 32 MHz, decode 78 selects 16 MHz as the next frequency.

A new select output will only be generated by one of the decoders 76 and 78. The decoder outputs are ORed by gates 84, 86, and 88, and the new select bit is stored in register 90. The bits in register 90, only one of which would be high, are then clocked into a frequency register and synchronizer 92. The register holds the new frequency and thus maintains a select input to the clock MUX 66. However, it is critical that the MUX select output be changed only at a proper time to maintain the proper phase and duty cycle of the clocks CLK and CLK 2. To that end, the output from register 90 is clocked into register 92 on the 32 MHz clock only after the register has been enabled by a frequency and phase decoder 94. The proper timing of the change in frequency is dependent on the old frequency, which is stored in WAS latch 96, the new frequency received from the output of register 90 and the free running clock signals received from the clock divider 64.

Figure 8:
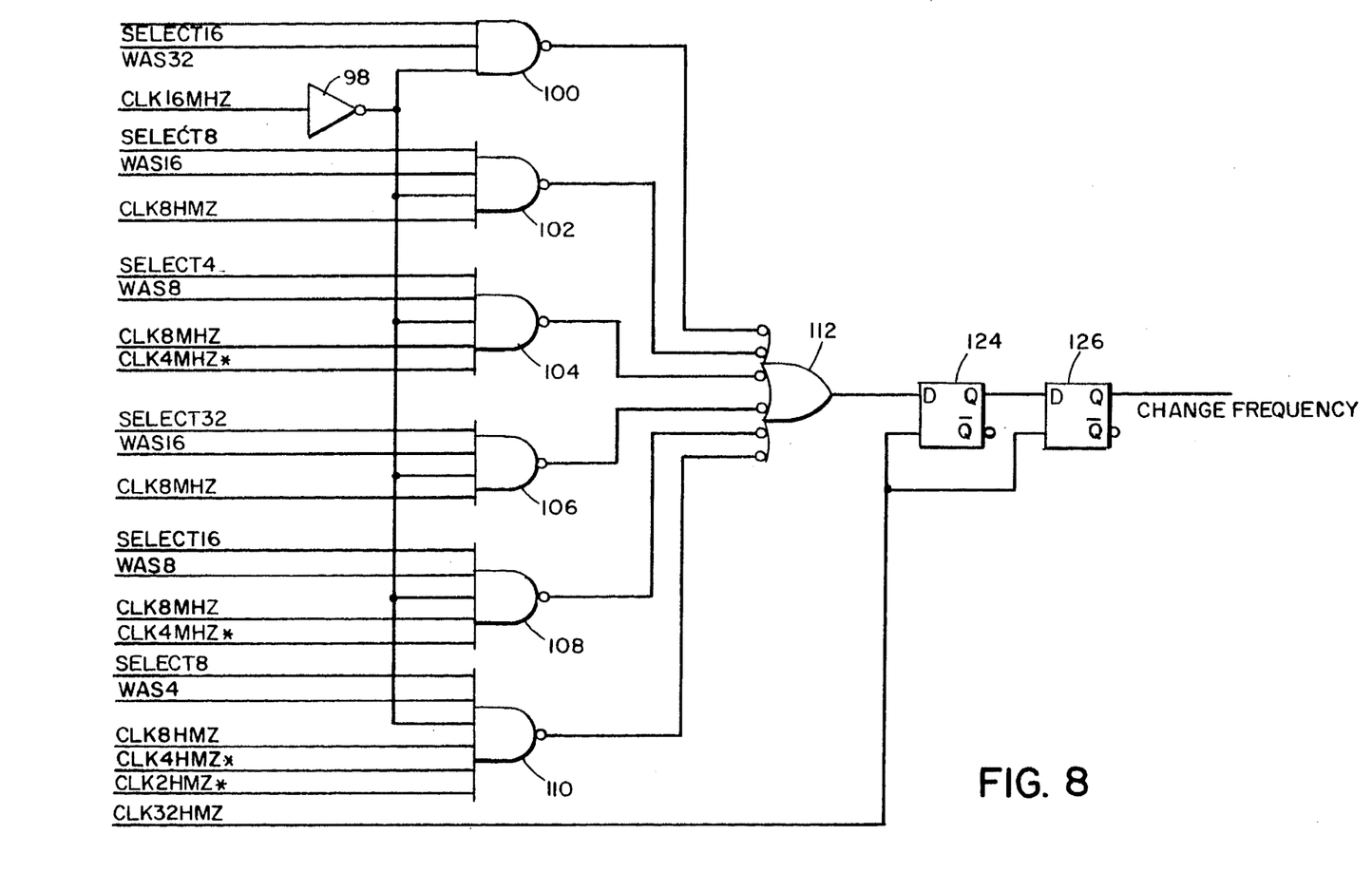
FIG. 8 is a logic diagram of the frequency and phase decoder of FIG. 6.

The specific logic of the frequency and phase decoder 94 is illustrated in FIG. 8. Proper phase and duty cycle after switching to the new frequency is maintained by generating the change frequency signal at a proper point in the cycles of the old CLK and CLK2 signals and the new CLK2 signal. Because the new CLK signal is derived directly from the new CLK2 signal, its timing need not be considered in the logic circuit of FIG. 8. When stepping down in frequency, the new CLK 2 signal is the same as the old CLK signal. Thus, only two clocks must be considered to set the proper timing and duty cycle.

In addition to providing the required CLK and CLK2 inputs to gates 100, 102, 106 and 108 the 16 MHz clock through inverter 98 drives all of the gates of the logic circuit in FIG. 8. That signal synchronizes the outputs of all of the gates to bring all signals into synchronization through the OR gate 112 and D flipflops 124 and 126.

When the frequency is stepped down to 16 MHz from 32 MHz, the phase is dependent on the 16 MHz clock, as well as the 32 MHz clock, and the 16 MHz clock is gated through inverter 98 and gate 100. When stepping down to 8 MHz from 16 MHz, both the 16 MHz and 8 MHz clocks are gated through NAND gate 102. When stepping down to 4 mHz from 8 MHz, the 4 MHz and 8 MHz signals are gated through gate 104 by the 16 MHz signal. When stepping up from 16 MHz to 32 MHz, the 8 MHz and 16 MHz signals are gated through gate 106. When stepping up from 8 MHz to 16 MHz, the 4 MHz, 8 MHz and 16 MHz signals are gated through gate 108. When stepping up from 4 MHz to 8 MHz, the 2 MHz, 4 MHz and 8 MHz signals are gated through gate 110 by the 16 MHz signal. The inverted outputs of the NAND gates are ORed in gate 112 and clocked through filpflops 124 and 126 to generate a change frequency signal. That change frequency signal indicates to the frequency register and synchronizer 92 that the MUX select should be changed on the next rising edge of the 32 MHz signal.

An output from gate 112 is only generated where a single step change is requested from register 90 by the SELECT input relative to the current frequency indicated by the WAS input. All other requests are ignored by the decoder 94.

The change frequency signal is applied to the frequency register and synchronizer 92 of FIG. 6. The signal causes a change in the MUX select output from the old frequency to the new frequency indicated on the select input from register 90. Details of the frequency register and synchronizer 92 as well as of the clock multiplexer 66 of FIG. 4 are presented in FIG. 9.

Figure 9:
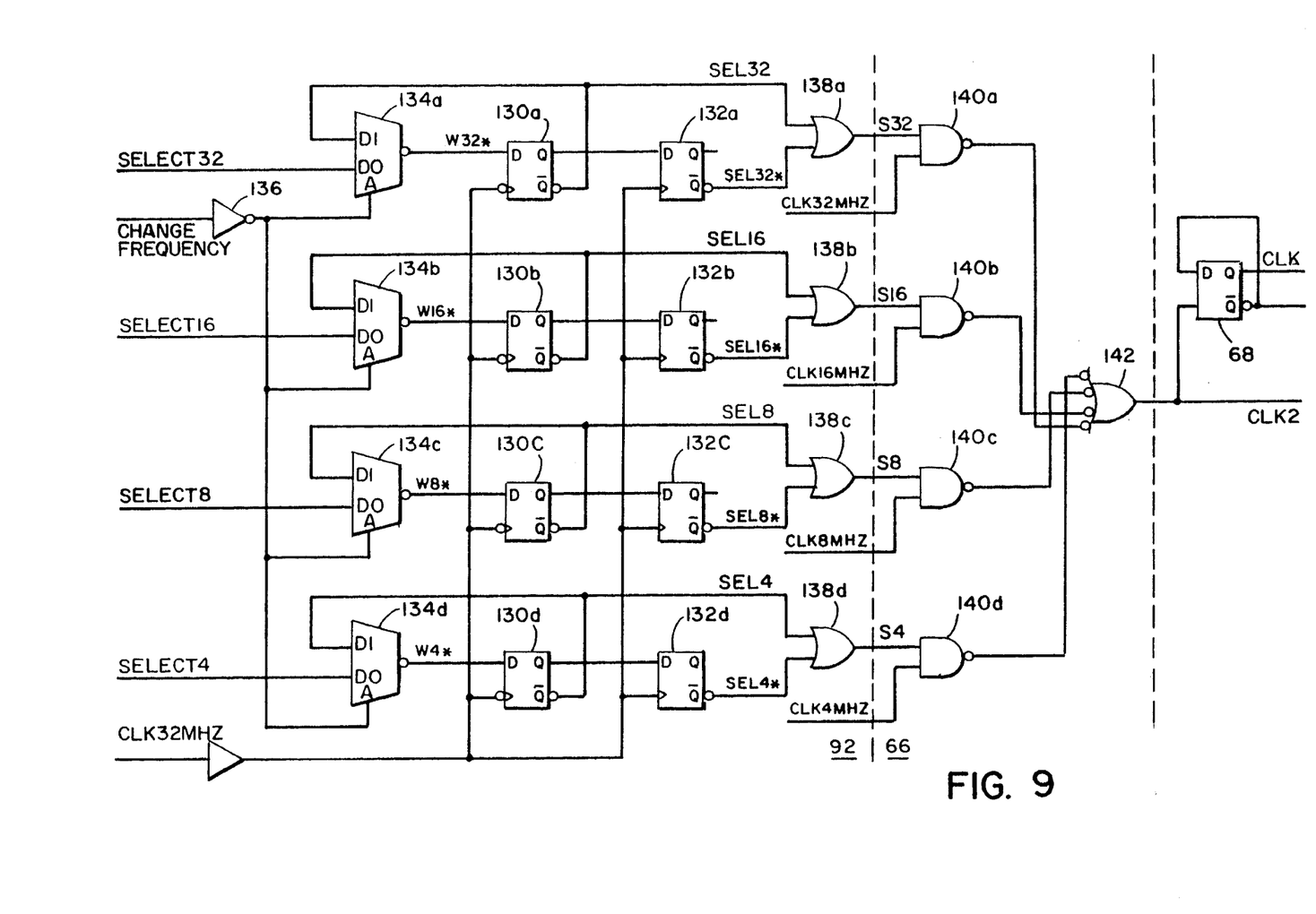
FIG. 9 is a schematic of the frequency register and synchronizer of FIG. 6 and the clock multiplexer of FIG. 4.
Figure 10A:
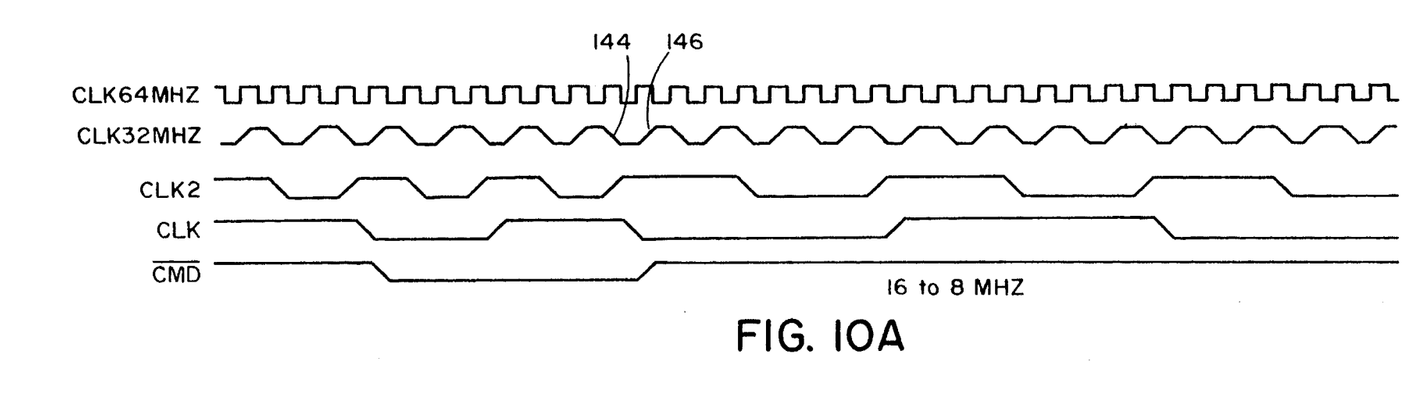
FIG. 10A is a timing chart illustrating the slowdown from 16 MHz to 8 MHz and FIG. 10B is a timing chart of speedup from 8 MHz to 16 MHz.
Figure 10B:
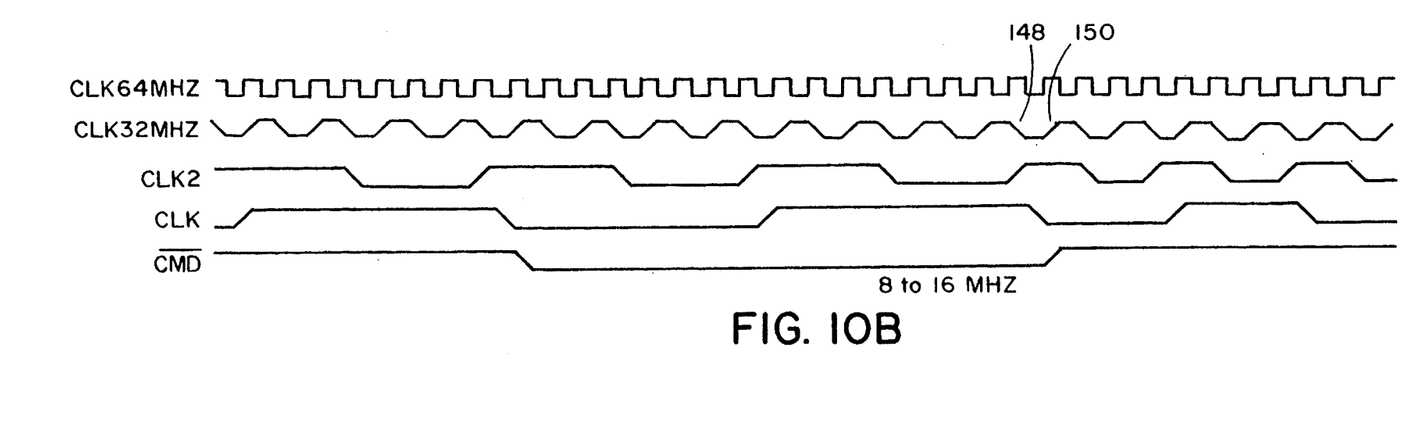

Prior to receipt of the change frequency signal, the old frequency is latched by flipflops 130 and 132 with feedback through the D1 input of the multiplexers 134. When the change frequency signal is received through inverter 136 and applied to the select inputs of the multiplexers 134, the select inputs from register 90 are selected at the D0 inputs of the multiplexers. Only one of those select signals will be high depending on the new frequency being selected. On the falling edge of the 32 MHz clock the select signals are latched in flipflops 130. On the next rising edge of the 32 MHz clock signal, the new select signals are latched into the flipflops 132. The outputs of the flipflops 130 and 132 are applied to OR gates 138. It can be seen that when the new select signals are latched into flipflops 130, the old signals remain at the output of flipflops 132. Then, on the next rising edge of the 32 MHz clock, the new select signals are latched into flipflops 132 and, through feedback through multiplexers 134, into flipflops 130. Thus, between the falling and rising edges of the 32 MHz clock, the gate 138 corresponding to the old frequency generates a select signal from flipflop a 132, and another of the gates 138 corresponding to the new frequency generates a select signal from a flipflop 130. After the next rising edge, the gate 138 corresponding to the old frequency no longer generates a select signal. Thus there is overlap such that a select signal for the new frequency is generated before the old select signal is removed. The four select bits from the gates 138 are applied to the multiplexer 66 which comprises NAND gates 140 whose outputs are combined in the inverted input OR gate 142.

Examples of frequency switching are illustrated in FIGS. 9A and 9B. In FIG. 9A, the system CLK2 frequency changes from 16 MHz to 8 MHz. On the falling edge 144 of the 32 MHz clock the select signals are latched into flipflops 130. Specifically, the inverted output of the flipflop 130c goes high while the inverted output of flipflop 130b goes low. The output of flipflop 132c remains low and the output of flipflop 132b remains high. Thus, during the next half cycle of the 32 MHz clock, both the 8 MHz and 16 MHz clocks would be selected through gates 138c and 138b. Since both clock signals are high, the actual output of gate 142 would be the same with either clock. On the next rising edge of the 32 MHz clock signal at 146, the new select signals would be latched into flipflops 132 as well. Thus the 8 MHz clock would remain selected but the select signal from gate 138b would be removed. Thereafter, the system would continue at 8 MHz.

Similarly, in FIG. 9B it can be seen that the new select signals would be latched into flipflops 130 at the falling edge 148 and into the flipflops 132 at the rising edge 150. In that case, the select signal from gate 138c would be retained by flipflop 132c as the select output from flipflop 138b was enabled from the flipflop 130b. On the rising edge 150, the select output from gate 138c would be removed.

While this invention has been particularly shown and described with reference to a preferred embodiment thereof, it will be understood by those skilled in the art that various changes in form and details may be made therein without departing from the spirit and scope of the invention as defined by the appended claims.

For example, the hardware could be designed to update the current speed bits as it changes the system speed in response to an interrupt. This would simplify the software algorithm of FIG. 5 and would eliminate the temporary increase in clock speed each time through the loop 50 of FIG. 5.

Further, the CPU 18 could be programmed to respond to software interrupts as well as the hardware interrupts disclosed above. A software interrupt is initiated by an interrupt instruction in the software rather than by an external hardware event. The software interrupt does not cause the CPU to run interrupt acknowledge cycles on the system bus and would thus not be detected by decoder 78. For the system to respond to software interrupts, the speed switching algorithm would be included in the interrupt handler for each software interrupt that should cause a return to normal speed. The speedup would be initiated by the interrupt handler through the decoder 76.

Software interrupts can only occur when software is executing. Thus, most of the time the system will not be waiting for an event but should already be running at the normal speed. In the system described above, all of the time critical events for which speedup of the system is required are hardware events. However, software interrupts may become more critical in, for example, a multitasking environment.

We claim:

1. A data processing system comprising:

memory;

a processing unit for processing software routines stored in memory at a normal frequency determined by a system clock; and a clock control circuit for generating the system clock, the clock control circuit including:

circuitry responsive to a control software routine processed in the processing unit to periodically slow the system clock to a reduced frequency while waiting for an event by executing a wait loop including:

software instructions to slow the system clock to a reduced frequency, followed by software instructions to determine whether the awaited event has occurred, followed by software instructions to return the system clock to the normal frequency and exit the wait loop when the awaited event occurs, and circuitry for decoding signals on a system bus indicative of an interrupt and returning the system clock to the normal frequency in response to said interrupt indicative signals independent of any of the software routines.

2. A system as claimed in claim 1 wherein the control software routine processed to slow the system clock comprises a routine in basic input/output system software initiated by application software.

3. A system as claimed in claim 1 wherein the clock control circuit generates a system clock having one of at least three frequencies, and the clock frequency is slowed to the reduced frequency in frequency steps, the frequency of each step being one of the at least three frequencies and returned to the normal frequency by the clock control circuit in frequency steps, the frequency of each step being one of the at least three frequencies.

4. A system as claimed in claim 1 wherein the clock control circuit comprises a clock source for generating respective clock signals having all available system clock frequencies and a selection circuit for selecting one of the respective clock signals as the system clock signal, the selection circuit comprising:

a software responsive circuit for receiving data input from the control software routine to generate a signal representing a first desired system clock frequency;

an interrupt responsive circuit responsive to the interrupt indicative signal to generate a signal representing a second desired system clock frequency dependent on the frequency of the system clock signal and the normal frequency;

a frequency register for receiving and latching one of said first and second desired system clock frequency representative signals from one of the software responsive circuit and the interrupt responsive circuit, respectively, to generate a system clock frequency select signal;

a multiplexer for selecting the one of the respective clock signals having the frequency represented by the system clock frequency select signal as the system clock signal; and a circuit for synchronizing latching of the one of the desired system clock frequency select signals in the frequency register to maintain a proper phase relationship of the system clock signal.

5. A system as claimed in claim 4 further comprising a register into which one of the software routines processed by the processing unit stores an indication of the normal clock frequency, the stored indication being read by the interrupt responsive circuit.

6. A system as claimed in claim 1 wherein the control circuit comprises a register into which one of the software routines processed in the processing unit stores an indication of the normal frequency.

7. A system as claimed in claim 1 comprising a register into which one of the software routines processed in the processing unit stores an indication of the reduced frequency.

8. A data processing system comprising:

memory;

a processing unit for processing software routines stored in memory at a normal frequency determined by a system clock; and a clock control circuit for generating the system clock having one of at least three frequencies, the clock control circuit including:

circuitry responsive to a control software routine processed in the processing unit to periodically slow the system clock to a reduced frequency in frequency steps, the frequency of each step being one of the at least three frequencies, while waiting for an event, circuitry responsive to the control software routine to return the system clock to the normal frequency in frequency steps the frequency of each step being one of the at least three frequencies, when the awaited event occurs, and circuitry for decoding signals on a system bus indicative of an interrupt and returning the system clock to the normal frequency in frequency steps, the frequency of each step being one of the at least three frequencies, in response to said interrupt indicative signals independent of any of the software routines, the interrupt indicative signals being first and second sequentially occurring interrupt acknowledge signals from the processor, a first step in frequency is caused in response to the first one of the sequentially occurring interrupt acknowledge signals, a second step, if required, is caused in response to the second one of the sequentially occurring interrupt acknowledge signals and a third step, if required, is caused in response to a delayed one of the sequentially occurring interrupt acknowledge signals.

9. A method of controlling the frequency of a system clock in a data processing system comprising:

executing a wait loop in a processing unit for periodically slowing the system clock to a reduced frequency from a normal frequency while waiting for an event to occur, the wait loop repeatedly performing the following steps;

slowing the system clock to a reduced frequency from a normal frequency, determining if the awaited event has occurred, and returning the system clock to the normal frequency and exiting the wait loop when the awaited event occurs;

detecting an interrupt by decoding signals on a system bus indicative of an interrupt; and returning the system clock to the normal frequency in response to the interrupt indicative signals independent of any of the software routines.

\* \* \* \* \*